Figure 1:
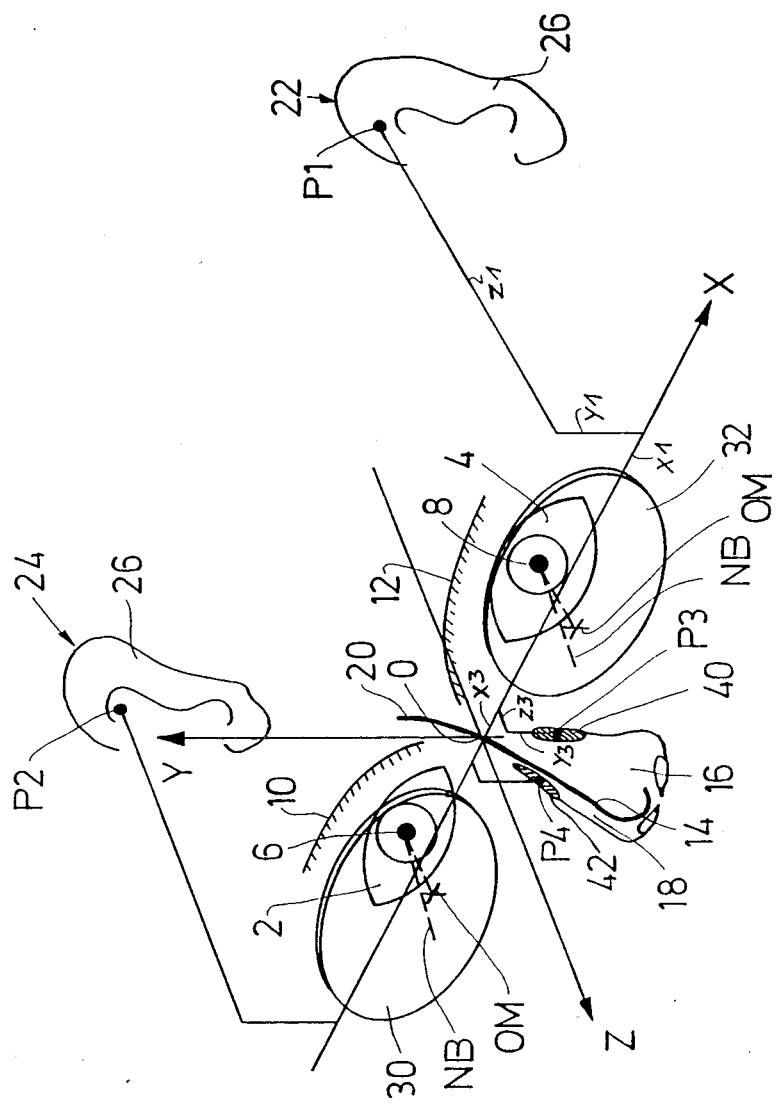

United States Patent [19]

Anger et al.

[11] Patent Number: 4,762,407
[45] Date of Patent: Aug. 9, 1988

[54] PROCESS FOR PREPARATION OF SPECTACLES

[75] Inventors: Wilhelm Anger, Via Brattas 4, CH-7500 St. Moritz, Switzerland; Eric Steinhauer, La Canada, Calif.

[73] Assignee: Wilhelm Anger, St. Moritz, Switzerland

[21] Appl. No.: 676,475

[22] Filed: Nov. 29, 1984

[30] Foreign Application Priority Data

Feb. 10, 1984 [DE] Fed. Rep. of Germany ....... 3436133

[51] Int. Cl.$^4$ ................................................ A61B 3/10
[52] U.S. Cl. ..................................... 351/204; 351/200; 351/205; 351/246
[58] Field of Search ................ 351/204, 200, 205, 206, 351/246; 33/200; 354/62

[56] References Cited

U.S. PATENT DOCUMENTS

| 397,744 | 2/1889 | Meyrowitz | 33/200 |
| 780,948 | 1/1905 | Hales | 33/200 |
| 2,302,190 | 11/1942 | Collins | 33/200 |
| 2,677,894 | 5/1954 | Belgard | 33/200 |

FOREIGN PATENT DOCUMENTS

| 0201850 | 8/1983 | Fed. Rep. of Germany | 351/204 |
| 2267736 | 4/1974 | France . | |

OTHER PUBLICATIONS

Fischbach, "Aids to Vision . . . ", published in Status in Fitting Spectacles, Pamphlet No. 2.

NATO, "Applications of Human Biosterometrics", published in SPIE, vol. 166 at pp. 235–243 (1978).
Platzek, "Brillenpassung . . . ", published in Feinmechanik und Optik, No. 11, 1955, pp. 292–297.

Primary Examiner—Rodney B. Bovernick
Attorney, Agent, or Firm—Roth & Goldman

[57] ABSTRACT

The process in accordance with the present invention is especially well-suited for the preparation of spectacles with a correction effect which are adapted both optically and mechanically, whereby the mechanical adaptation is objectified to at least a considerable degree and the mechanical adaptation depends to a lesser extent or not at all on subjective evaluations of the fits of the spectacles on the part of the fitter or the spectacle wearer. For each nose piece of the spectacles the location of at least one nose point on or near the contact surface at which the bridge reposing surface touches the nose, is measured in space relative to two reference points, for example, the eye centers. From this nose point measurement the location of the pad nose piece reposing surface which the latter is to occupy in space on the completed spectacles is determined, which occurs, for example, under the assumption of pressureless contact between the contact surface and the reposing surface. Corresponding to this determination the nose piece of the spectacles are physically shaped, specifically in their correct relative position with respect to the lenses since a target position has been predetermined for the lenses with respect to two reference points in space.

31 Claims, 4 Drawing Sheets

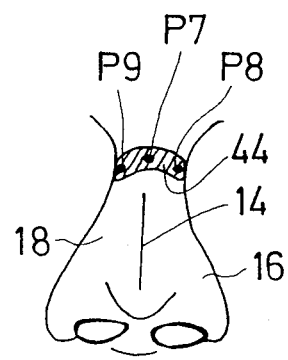
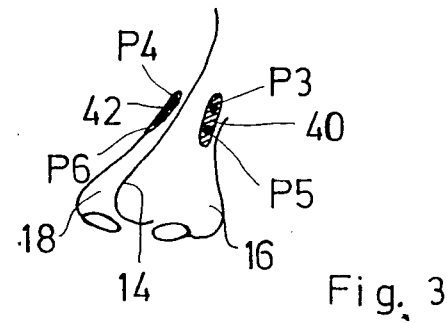
Fig. 2  Fig. 3
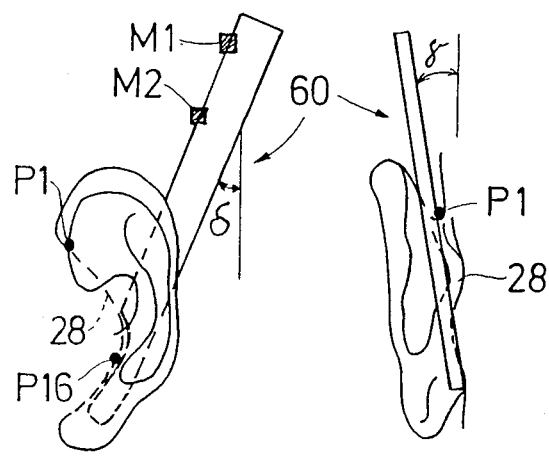
Fig. 7  Fig. 8  Fig. 9
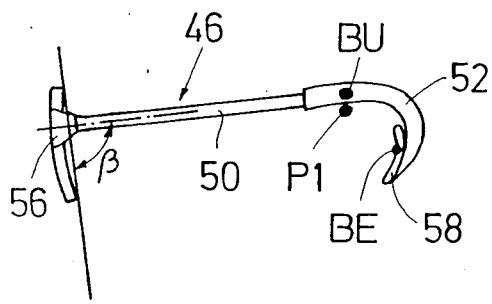
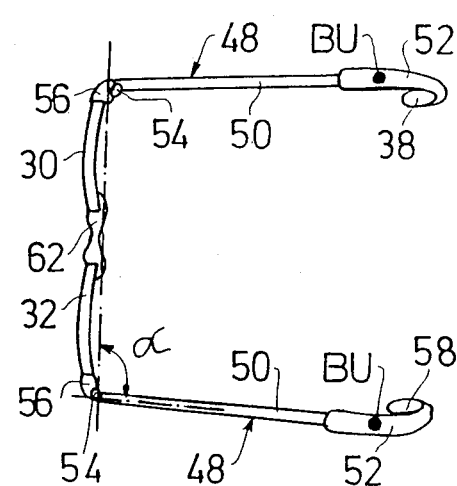
Fig. 4  Fig. 5

PROCESS FOR PREPARATION OF SPECTACLES

The present invention relates to a process for the preparation of spectacles from two unfinished lenses and a frame having at least a bridge, a nosepiece, two flanges and two temples. Although the process in accordance with this invention presents special advantages in the preparation of spectacles with a correction effect, it is also applicable to the preparation of spectacles with no correction effect, as for example in the preparation of sunglasses. The term "spectacles" in conjunction with this invention includes in addition to the usual plastic frames, metal frames, combined frames and frames for rimless spectacles also so-called fittings for metal-fitting spectacles qua lens spectacles in which the lenses are surrounded neither top nor bottom by an eyewire and in which the mechanical connection between the bridge and each of the flanges or each of the hinge pieces is accomplished solely by the respective lens.

The frame of the spectacles is intended to hold the two glass lenses in such a position in front of the eyes that the lenses can fulfill their desired function. The frame for its part must support itself on the head and it is supported specifically with at least one nose pad on the nose and by the end pieces of the temples in the region of the ears and on the skull. Because of individual differences from spectacle wearer to spectacle wearer inadequately taking into account the features of the face, the ears and the remainder of the head of the spectacle wearer causes the spectacles to sit poorly. This is frequently manifested by excessive pressure at the contact surfaces, which in turn can cause pressure points, pains and complaints, can result in the spectacles being too easily dislodged to actual positions in front of the eyes that deviate from the intended positions, and in a sharp diminishing of the appearance of the spectacle wearer and the vision correction of the lenses, and accordingly of his sense of well-being. Thus it is generally demanded that spectacles sit well, for which reason in the course of the manufacture of a pair of spectacles a so-called mechanical adaptation usually takes place through which the elements of the spectacles or frame impinging on the contact surfaces are supposed to be brought into positions that will guarantee a "proper" fit.

The known process will be explained more closely in the following, referring to the example of spectacles with a correction effect since spectacles with a correction effect are normally worn constantly.

In the known process the procedure used is such that the spectacle wearer is shown sample spectacles into which no corrective lenses have been inserted and these are tried on. From these samples the spectacle wearer chooses a certain model of spectacles, through which process be will determine, for example, the type of frame (plastic frame or metal frame or frame for rimless glasses, etc.), the shape of the frame, the material of the frame, the color of the frame and also the shape and size of the lenses and in the vertical and horizontal directions in front of the eyes is roughly determined. On the spectacle wearer's face certain contact surfaces are determined for the contact of the nosepiece or nosepieces of the frame model selected by taking a measurement of the width of the bridge of the nose, whereby the measurement is accomplished by applying a measuring rule. By virtue of this measurement the width of the bridge can be ascertained for the spectacles to be produced. In a frame in which the interval between the pad bridges is linked with the width of the bridge a determination of the nosepiece is thus also accomplished while taking into account the measurement of the contact surfaces (by measuring the width of the nose bridge). In addition, the approximate interval between a projection of the root of the nose bridge on the rule and the ear is measured on the head of the spectacle wearer by applying a measuring rule to the temple in order to determine what length the temple should be. Finally, by the use of calipers the distance is measured from one temple to another as well as from the base of one ear to the other. Subsequently, a frame is then employed for purposes of preparing the spectacles which has this measured width of bridge and thus necessary nosepiece, separation and the required temple lengths, whereby the temples are so aligned that their minimum separation is equal to the distance from temple to temple and that those points on the temple that come to lie near the root of the ear have a separation equal to the distance measured between the roots of the ears. Although this frame in several points is already adapted to the individual needs of the spectacle wearer, the extent of the mechanical adaptation will still be insufficient to provide a good fit.

In the further course of the known process for the preparation the frame is further adapted by trying it on the spectacle wearer. The prepared frame is fitted on the spectacle wearer in the manner described in the foregoing and the frame is altered on account of the inspection by the fitter on the one hand and of the comments of the spectacle wearer on the other. This can occur by bending the temple, the temple pieces, the hinges, and possibly the bridge supports by means of plastic deformation with heat in the case of thermoplastic frame materials and by the removal of material, especially by filing off material from the frame in the case of metal frames. The success of this adaptation depends strongly on the manual skill of the fitter and the collaboration of the spectacle wearer, the subjective feeling of whom is ultimately the sole source of information for further changes in the frame. It will be obvious that the danger of a faulty fitting will be great, for a pressure on one or both ears, for example, as reported by the spectacle wearer is normally counteracted by deforming the assigned temple end piece although this can be caused by an unsuitable shape of the temple end piece at the other of the two ears or of the nosepads.

Although the result of the above-described mechanical adaptation will frequently not result in maximum wearing comfort, the frame is said to be mechanically adapted. In the case of spectacles without a correction effect the total adaptation will thus be finished since no optical adaptation of the spectacled lenses need occur; they can be fitted in together with the frame before of after the subjective mechanical adaptation. The position in which the frame holds the spectacle lenses relative to the eyes of the spectacle wearer after the mechanical adaptation has taken place is the target position of the lenses. In the following the target position is defined as that position of the two spectacle lenses relative to at least two points of reference assigned to the eyes in which the frame is intended to hold the lens on the spectacle wearer. The target position can, for example, be specified along with the prescription values before the spectacles are prepared or even not be determined until the time of the preparation of the spectacles. In the known processes described here the target positions of the individual lenses are not specified at the outset, but are determined by virtue of the mechanical adaptation that the positions automatically assumed for the two lenses in the course of the mechanical adaptation are accepted and defined as their target positions.

The correction effect of a spectacle lens depends on its position in the space relative to the assigned eye. The value of the prescription, i.e. the prescribed dioptric effect of the spectacle lens as based on a determination of refraction, is based on the assumption of a given position of the lens relative to the eye, as for example a vertex distance of 12 mm. To the extent of this particular position as based on the value of the prescription differs from the target position of the spectacles, an adjustment or correction of the prescription value will be necessary if the spectacles are to be optically fitted. In order to make this optical adaptation possible a series of measurements thus will be taken in the known process subsequent to the mechanical adaptation, among which belong the measurement of the interval between the eyes, measurement of the vertex distance, measurement of the tilt or bend forward of the plane of the lens and, if required, measurement of the lateral inclination of the lens and measurement of the bifocal segment height. On the basis of these measurements the required corrections and adjustments of the prescription values can be determined and if necessary decentrations of the spectacles lenses can be accordingly prepared. The above-named measurements, all of which with the exception of the interval between the eyes involve the previously mechanically adapted frame, will not be taken into account in the mechanical adaptation and do not affect its validity. Lenses prepared in this manner are fitted together with the mechanically adapted frame, so that finished spectacles are present which are adapted optically and which according to the state of the art are also adapted mechanically.

It has been demonstrated, however, that spectacles prepared according to this known process will frequently cause complaints and have an uncertain fit, for which an obviously insufficient mechanical adaptation will be assumed as the cause.

For the purpose of facilitating the mechanical adaption of spectacles a nose profile template (FR-PS 22 67 736) is known which makes it possible to scan a two-dimensional profile of the nose of a spectacle wearer and copy it mechanically. By using the simulated profile the choice of sample spectacles can be made simpler in that sample spectacles obviously not fitting the bridge region need not first be tried on the spectacle wearer and a rough check is given on the individually prefabricated spectacles. This will possibly simplify the work of the fitter. A greater degree of precision in fitting and a mechanically better fit of the frame cannot be attained with this template.

In addition, the method is also known ("Statics in Fitting Spectacles", Pamphlet No. 2. "Aids to Vision with Improved Wearing Comfort through a New Fitting Technique" by Gunther Fischbach, Pfinztalstrasse 38, published by the author) for improving the mechanical fit of making a determination of the pressure made on the nose by bridges. For this purpose the nose wedge angle is measure, i.e. the angle formed by the two flanks of the nose in the plane of the frame, the size of the surface is ascertained or estimated in which the bridge and the nose come into contact, and the weight of the spectacles is calculated or determined by weighing. The pressure ascertained from this, when taken in comparison with the admissible or optimum pressure values, is supposed to make it possible to determine how comfortably the spectacles can be worn. This will improve the ability of the fitter to advise the spectacle wearer and provides the possibility to eliminate from consideration certain frame models that would cause too great a pressure. However, this determination of pressure means of a calculation does not make for better results in the actual mechanical fitting as described in the above and in which the attempt is made to bring the temple, the temple end pieces and the nosepiece or nosepieces into the suitable positions.

Finally, the method is known of getting stereoscopic photographs of the faces of spectacle wearers by employing a photogrammetric process and from these to obtain primary data for the preparation of spectacle frames (SPIE Vol. 166 Applications of Human Biosterometrics (NATO) (1978), pp. 235–243). In this average nose profiles and average intervals, as for example average eye intervals, average intervals of the base of the nose from the root of the ear in side view, average ear root intervals and the like are measured. The measurements resulting from this may help make it easier for those preparing spectacles to supply frames for spectacle wearers in which the individual measurements correspond to the average measurements; but the subjective, mechanical fitting has to be carried out for each such frame in the same manner as described in the foregoing.

The present invention is based on the task of improving this generic process in such a manner that it will enable spectacles to be prepared with improved mechanical fit.

This task is solved in accordance with the invention that for each nosepiece of the spectacles the position of at least one nose point in or near the contact surface of the nose of the spectacle wearer is measured in space relative to the reference points, that from this nose point measurement the site of the reposing surface of each nosepiece in space is determined, and that the spectacles are formed by aligning each nosepiece with this particular site on the reposing surface.

In the process in accordance with the invention a nose point is measured in three dimensional space on the face of the wearer of the spectacles for each nosepad of the spectacles. In the case of spectacles with two nosepads the position in space they should occupy is measured three dimensionally at two positions or points on the nose. These two nose points will lie on or near the respective contact surface of the nose, which when the spectacles are in place will be in contact with the assigned reposing surface of the respective nosepads. Thus these two nose points become a criterion of where the reposing surface of the respective bridge should be located in space when the spectacles are put on in order for the reposing surfaces to touch the assigned contact surfaces. The nose point measurement in space is accomplished in such a manner that their position is measured relative to the same reference points relative to which the spectacle lenses assume their target positions. But this nose point measurement also delivers at the same time a spatial coordinate between the measured nose points and the spectacle lenses in their target position, so that the position of the reposing surface of the nosepads in space as assigned to the respective nose point can be determined relative to the spectacle lenses. In this spatial relationship the site of the respective reposing surface and the lenses are formed on the spectacles so that a middle component of the spectacles is created in which at least the one nosepad and the lenses are arranged both optically and mechanically in a spatially correct relationship with one other: if the lenses are situated in their target position on the face and in front of the eyes, the reposing surfaces will be located at those locations which had to be assumed by the reposing surfaces by virtue of the individual situation of the nose points of the wearer of the spectacles in order to be in contact with the assigned contact surfaces. This will mean the best possible mechanical adaptation of the middle component of the spectacles. If the reposing surfaces are in contact with the assigned contact surfaces of the nose, the frame will keep the spectacle lenses in their target position. In the glasses prepared in accordance with this invention the occupation thus of the target position by the spectacle lenses and the occupation of the correction location of the reposing surfaces by the respective nosepad, i.e. the correct mechanical adaptation, are linked with one another. If in case of spectacles with correction effect the spectacle lenses are optically adapted for their target position and the target position corresponds to the position based on the prescriptive values, the spectacles prepared in accordance with the invention will be fitted optically and be adapted mechanically to perfection.

The determination of the site of the reposing surface of any one nosepad by virtue of nose point measurement will be accomplished in such a manner that it will be required of the reposing surface both to touch the assigned contact surface (and not leave open any intervening air space) and to press onto the contact surface not exceeding a slight degree that is determined by the properties of the skin in the region of the contact surfaces. If these two limiting conditions are observed, it will guarantee that both the reposing surface will be in contact with the contact surface and thus that the assigned nosepad can fulfill its support function, and that the skin in the region of the contact surface will not be excessively distorted. It is appropriate to specify that the as yet unstressed contact surface, i.e. the contact surface in its condition during the nose point measurement, and the reposing surface touch each other without pressure, so that a nose point in the contact surface will simultaneously become also the point of the reposing surface in the space after their locations have been determined.

Depending on the number of nose points measured for each contact surface and depending on the shape of the contact surface, an adequate determination of the location of the reposing surface of the respective nosepad will also be possible when the nose points measured are not in, but near the contact surface. Several possibilities exist for forming the spectacles to the particular location of the reposing surface of the respective nosepad, among them the traditional and above-described one of filing or reshaping with application of heat in the instance of nosepieces formed in one piece with the frame and its bridge, of bending in the case of pinshaped nose supports, for example, made of metal, or also of a fairly large number of component parts formed with variety of locations for reposing surfaces, whereby the component chosen will then be attached to the remainder of the frame. A further possibility lies in getting a nosepiece that is jointed and can be spatially shifted with respect to the rest of the frame to position its reposing surface in the desired location in the space, and thus relative to the lenses, and to lock it into that desired position. It will be understood that the above list of possibilities for forming the spectacles with the particular locations of reposing surfaces is not conclusive.

The spatial and three-dimensional nose point measurement can be conducted with the aid of any stereogrammetric measuring process that is also suited for taking measurements on human beings and especially on the face. Optical stereoscopic measuring procedures are known, for example, through U.S. Pat. No. 4,286,852, U.S. Pat. No. 4,199,253 and U.S. Pat. No. 4,238,147.

As will be noted from the above description of the present invention, this requires no evaluation of the fit of the frame for the purpose of mechanical adaptation on the part of the fitter nor any subjective judging of how good the fit is and reporting back on the part of the spectacle wearer. These subjective evaluations which are the basis of the mechanical fitting in the traditional procedure can be dispensed with in the process in accordance with the invention—at least with respect to the mechanical fitting of the nosepad or nosepads—and are replaced by objective measurement. The danger of inadequate adaptation through individual misjudgment of the fit on the part of the spectacle wearer or of the fitter is thus made less possible in the procedure according to the invention; this affords a constantly high quality of the mechanical fitting. In contrast to the subjective mechanical fitting an objective mechanical fitting is thus carried out in the process according to the present invention. This characteristic of the process according to the invention, however, does not exclude the possibility of the fitter's checking the fit, if necessary, of the nosepad or nosepads in addition to the objective mechanical adaptation and of making additional corrections.

As furthermore noted in the above description of the present invention, it is not required for purposes of the mechanical adaptation of the frame for it to be physically present and positioned on the spectacle wearer. The step of comparing a specific assembled frame intended for the spectacle wearer with the individual physical features of the spectacle wearer as constitutes the basis of the mechanical fitting in the known process, is replaced in the process according to the present invention (for the adaptation of the middle component of the spectacles) by the three-dimensional measurement of the nose points, which obviously does not presuppose a completed frame. This opens a series of new possibilities in the preparation of spectacles. Thus, for example, the nose point measurement can be conducted by a fitter with no experience in the field of traditional mechanical fitting and have no frame available with which to conduct the fitting. In addition, the nose joint measurement can be carried out as the basis for the mechanical fitting of the middle component before the physical preparation of the individual frame has even begun. If use is made of this possibility, the traditional sequence of steps of "first make the frames and then do the mechanical fitting of the prepared frame" is reversed by the present invention or replaced by the sequence of steps "first get the data required for the mechanical fit and then prepare the (already mechanical adapted) frame."

Since in the process according to the invention the location of the reposing surface of each nosepad is determined in spatial relationship to the spectacles lenses in their target position and realized on the spectacles, it will be possible in process according to this invention to prescribe the target position of each respective lens in a simple manner. In the traditional way of proceding it is very expensive to shape a finished frame in such a manner that it is both made to fit mechanically as well as to retain the lenses in their target positions which are prescribed without any knowledge of the alignment of the frame on the face of the spectacle wearer as a result of the mechanical adaptation. For this reason thus in the traditional procedure described in the beginning, the position of the lenses that exists after the conclusion of the mechanical fitting will be defined as the target position. The optical disadvantages that might possibly result from this are avoided by application of the present invention, as is the necessity of incurring any high expenditure in labor to realize a certain prescribed target position on the spectacles. Finally, the process in accordance with the present invention makes possible the preparation of prescription spectacles fitted both mechanically and optically in one work procedure, without it being necessary for the spectacles to leave the workroom for the purpose of making a mechanical fit in the presence and with the assistance of the spectacle wearer before the lenses are finished and joined into the frame. (The preparation of spectacles in one work procedure is already known and is even the most frequently used way of proceding; but in this the optical fit is not carried out, so that the spectacles are fitted in the traditional manner and thus fitted inadequately, mechanically and optically not at all.

The measurement of the location of one noise point per contact surface permits in numerous instances of use an adequate and precise determination of the location of the reposing surface of the relevant nosepad and specifically in those instances in particular in which the nosepad is supported on the remainder of the frame in such a manner that the reposing surface can be freely aligned within boundaries. This will be the case, for instance, when the pad is mounted on a bridge support by means of a ball-and-socket-joint connection and this ball-and-socket-joint connection is situated close to the reposing surface of the nosepads. In this case the nearest point of the reposing surface can be determined for the ball-and-socket-joint connection so that it will lie on the location of the measured nose point when the spectacles are put on.

In a preferred embodiment of the present invention, however, provision can be made of the locations of several nose points to be measured for each contact surface and to determine not only the location of the relevant nosepad reposing surfaces from this measurement but also their directions in space and form the spectacles correspondingly. This will be especially appropriate when the connection of the bridge or bridges with the remainder of the frame permits no relative movement in the completed spectacles.

As reference points assigned to the eye will preferably serve centers of the eyes, which is especially recommended in spectacles with a correction effect since in these spectacles the locations of the centers of the eyes will in any event have to be given to make the optical fitting. But the two inner or the two outer points of the corner of the eye can also serve as reference points, for which purpose the measurement of the locations of the inner points of the corners of the eyes is particularly advantageous, because their situation in the geometry of the face gives more data than the centers of the eyes. It will be obvious that both the locations of the centers of the eyes and the locations of the inner and outer points of the corners of the eyes can be measured, whereby the locations in space need not be measured for all points as long as the locations for one of the pairs of points can be measured three-dimensionally.

In an advantageous preferred embodiment of the present invention the procedure is followed in the measurement of the locations of the measured nose points in such a manner that two coordinates of the location of the point to be measured are prescribed in a reference plane running essentially parallel to the face of the wearer of the spectacles and the third coordinate is the distance of the point from the plane of reference It will be understood that despite the specification of two coordinates and calculation of the third coordinate for describing the location of the relevant nose point is altogether a measurement of location in space. The result of the measurement is the specification of the location in space through all three coordinates and not, say, through one coordinate, the value of which is the distance from the plane of reference.

Through the process in accordance with the present invention to the extent that it has been described here a pair of spectacles will be created in which the system consisting of the eyes, the spectacle lenses and the nosepads reposing on the nose is in and of itself harmonized. This system has to be secured by the temples of the spectacles, for which purpose each of the temples has the task of anchoring and supporting the spectacles on the ear assigned it and/or on the skull in the vicinity of the ear. On account of the contact thus present there between the ends of the temples and the ears and/or skull, a mechanical adaptation must also be conducted in this area as well. In connection with the process in accordance with this invention the mechanical adaptation of the temples can be carried out in the conventional manner, whereby, however, the peculiar circumstance will exist that in the course of the conventional fitting of the temples the effect is exclusively on them and no further alterations are made on the middle component of the spectacles. Because the middle component has already been fitted mechanically and only the temples need to be altered, the probability of an inadequate or faulty mechanical adaptation of the spectacles as a whole is diminished and a higher mechanical quality of fitting is attained.

In an advantageous preferred embodiment of the present invention, however, the measurement of the location of at least one of the determinative points for what form the temple will take is also conducted in the region of the ears, this point being in space relative to the reference points already serving as reference points for the nose point measurement. By virtue of this measurement a determination is then made of how the respective temple is to be arranged in space relative to the spectacle lenses and accordingly relative to the remaining parts of the frame and how it is to be shaped.

For this purpose provision can be made in a preferred embodiment of the present invention for the location of the upper point of the root of the ear at the transition between the skull and the auricle of the spectacle wearer to be measured for each ear in the space relative to the minimum of two reference points, for the location of the temple transition point to be determined in space for each respective temple drawing from this measurment of the ear root point, and for the spectacles to be shaped with this particular location of the temple transition point. The temple transition point is defined as that point of the temple on which the temple section located anterior to the ear becomes the temple end piece and which is situated above the upper point of the base of the ear. The determination of the temple transition point can, for example, be accomplished in such a manner that it is located vertically above the ear base point at a narrow interval of, for example 2 mm. Another relative site with respect to the upper ear root point can also be specified or the temple transition point. The temple transition point will then have a defined situation in space relative to the middle component of the spectacles which will be realized in the preparation of the spectacles. The temple end pieces will then solely have the task of making sure that the temple transition points are actually located in that position relative to the ear roots points than has been made a basis in determining the locations of the temple transition points. Practically speaking, this can occur by having (for the purpose of adapting the temple end pieces) an index mark indicating the temple transition point on the temple 2 mm vertically above the ear base point arranged and kept in place and mechanically adapting the temple end piece in such a way that it will of its own cause this index mark to remain in this place. With this method of fitting, the fitter no longer has any effect on the angle of opening and angle of inclination of the temple, nor on how long it will be between its hinge and the temple transition point. The subjectively affected portion of the mechanical fitting on the part of the spectacle wearer and the fitter is limited to the fitting of the temple end pieces, so that the mechanical adaptation is accomplished overwhelmingly by objective means by virtue of the measurements taken. This will guarantee a very high quality of the mechanical fit.

If a second contact surface on the skull and/or ear is provided on either side of the spectacle wearer's head for the contact with a temple end piece, provision can also be made in a further preferred embodiment of the present invention. By this embodiment, in addition to the measurement of the ear root point or as an alternative to it, the location of at least one ear point in or near each of two secondary contact surface of the skull and/or the ear can be measured in space relative to the minimum of two points of reference. From this measurement the location of the reposing surface of each temple end piece will then also be determined and finally the spectacles will be formed by a corresponding choice or by aligning each temple end piece with this particular location of the temple end piece reposing surface. With this approach, every sort of manual mechanical fitting is dispensed with and the entire mechanical fitting is objectified since the locations and orientations of all elements standing in contact with the wearer of the spectacles have been determined and formed in space by virtue of measurements of the assigned points on the nose and the ears as well as the skull of the wearer. It will suffice for numerous instances of use and shapes of temple end pieces to measure the location of only one ear point for each ear. This will be especially true for the case when the temple end piece has a design that permits of a certain amount of independent alignment of its reposing surface on the ear and skull. But the locations of several ear points can also be measured close to each ear in or near each each second contact surface, and the temple end piece reposing surfaces aligned accordingly. The relevant formation of the temple end pieces is accomplished, for example, by a choice of a temple end piece with a particular form from an assortment of variously shaped temple end pieces, by means of bending, by filing, or by plastic reshaping with application of heat.

In the above, the process in accordance with the present invention is described in detail, by means of which formation of spectacles is attained for those surfaces of the spectacles coming into contact with the face and ears and/or skull of the spectacle wearer by virtue of spatial measurements on the wearer so that those particular surfaces are fitted individually to the spectacle wearer in an optional manner. In addition to providing surfaces standing in contact with the wearer, spectacles also have elements that are not meant to come in contact with the wearer, because such contact would be disturbing. The disturbing contact that can occur chiefly will be at the upper, lower and inner borders of the lenses, or the eyewires located there.

In a preferred embodiment of the present invention, provision can also be made to measure in space the locations of points in danger of collision, i.e. of points at which contacts should be avoided, and for the spectacles to be formed in such a manner that the relevant elements of the spectacles will have an adequate interval with these points.

Preferably the procedure will be such that for each eye the location of at least one brow point in the region of the eyebrows, the location of at least one cheek point in the region of the cheeks beneath the eye and the locations of at least three flank points defining one area on each of the flanks of the nose will be measured in space relative to the minimum of two reference points and for the spectacles to be formed with a target position for each lens in which the lens and frame surfaces nearest the cheek point, the brow point and the nose flank will maintain a minimum interval with the nose flank, brow point and cheek point, respectively. In so doing it will he understood that the minimum interval with the cheek point can be different from the minimum interval with the brow point and this in turn can be different from the minimum interval with the nose flank.

In the above mentioned embodiment of the present invention the procedure in detail is such that the spectacle lenses are arranged in front of the eyes in an initial target position by calculation or graphically with the selected shape, selected size, selected width of bridge and dioptric effect in accordance with the prescription. With this target position it can be a matter of position chosen from optical and aesthetic standpoints, in which the spectacle lenses have a vertex distance of 12 mm, a ccertain inclination forward and a certain lateral inclination. The determination will then follow by computation (or graphically) of the smallest intervals of the two lenses (including eyewires if present) from the locations of the brow and cheek points measured, as well as from the nose flank measured. If one of these intervals is smaller than the minimum interval specified for this, the respective lens will move away from the eye by computation (or graphically) far enough, and thus into a second target position, that the required minimum interval in question will be attained. Here it is possible to proceed, for example, according to a schematic drawing so that first the vertex distance is enlarged by a certain amount and that then if this is not sufficient, the inclination forward or lateral inclination is changed. In this manner a target position is obtained for the lenses in which they will adhere to the requisite minimum intervals and in this manner collisions are avoided in the desired extent. This final target position is then used to position, orient and fit frame components relative to the nose support areas and ear roots, etc. In the above explanation of this oreferred embodiment of the present invention by the avoidance of collision, the tarqet position of the lens is the result of the measurement of the location of points on the face of the spectacle wearer and of the evaluation of this measurement. This shows that the target position for its part can be ascertained by measurements and that it can be changed proceeding from an initially assumed position to the final determination.

In a preferred embodiment of this invention provision can furthermore be made for all measurements conducted, e.g. nose point measurement, ear root point measurement, ear point measurement, measurement of the inner and outer eye corner points and measurement of collision points, i.e. the measurement of the brow, cheek and possibly nose flank points, to be accomplished simultaneously and without conflict, which is fundamentally possible with the aid of the previously mentioned stereoscopic measuring process. In this the participation required on the part of the spectacle wearer for purposes of the mechanical fitting is reduced to his participation in having a stereoscopic photograph requiring little time of his face, including the areas of the temple and the ear. It will be seen that this is very comfortable for the spectacle wearer and takes very little of his time.

Additional preferred embodiments of the present invention are characterized in the dependent claims.

Figure 6:
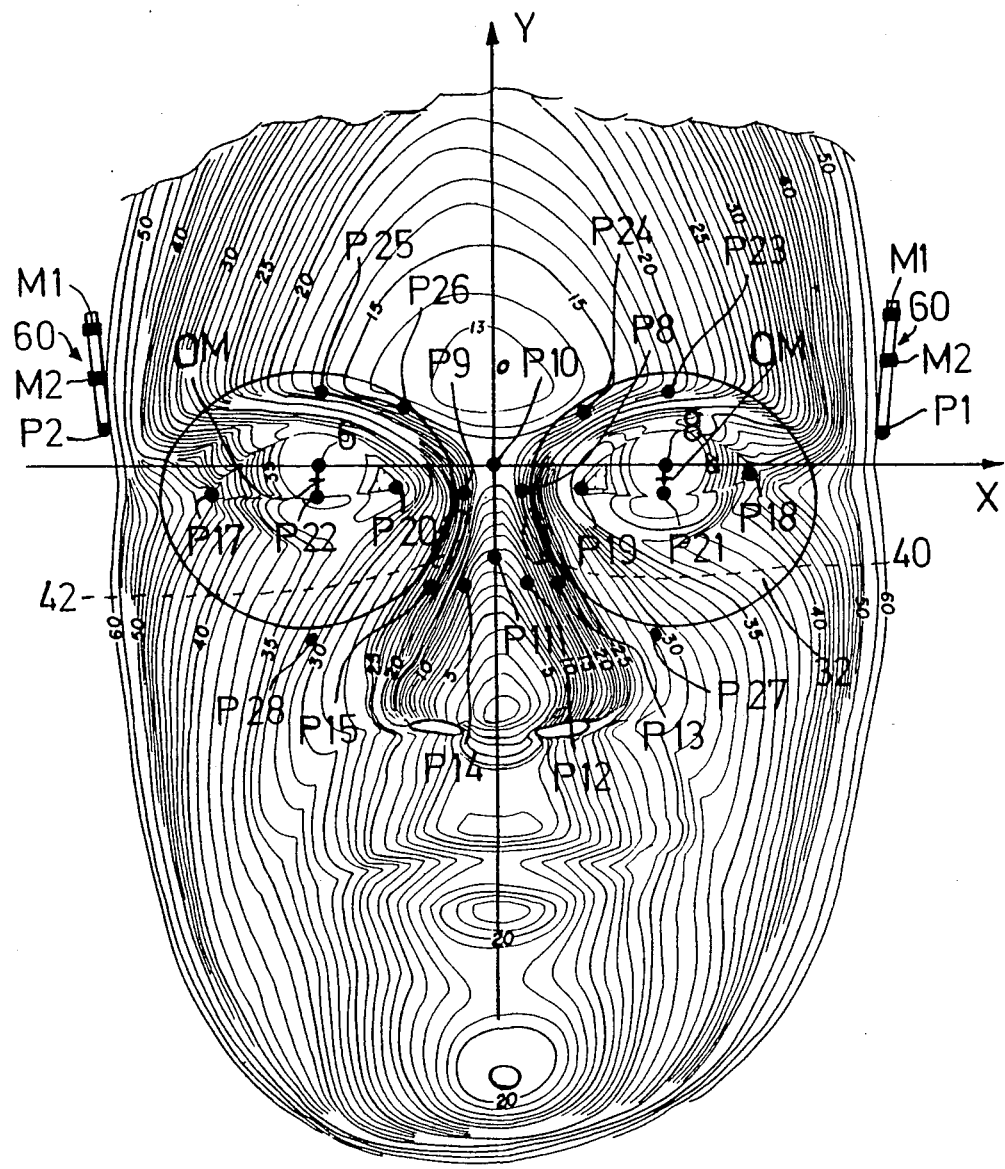
Figure 10:
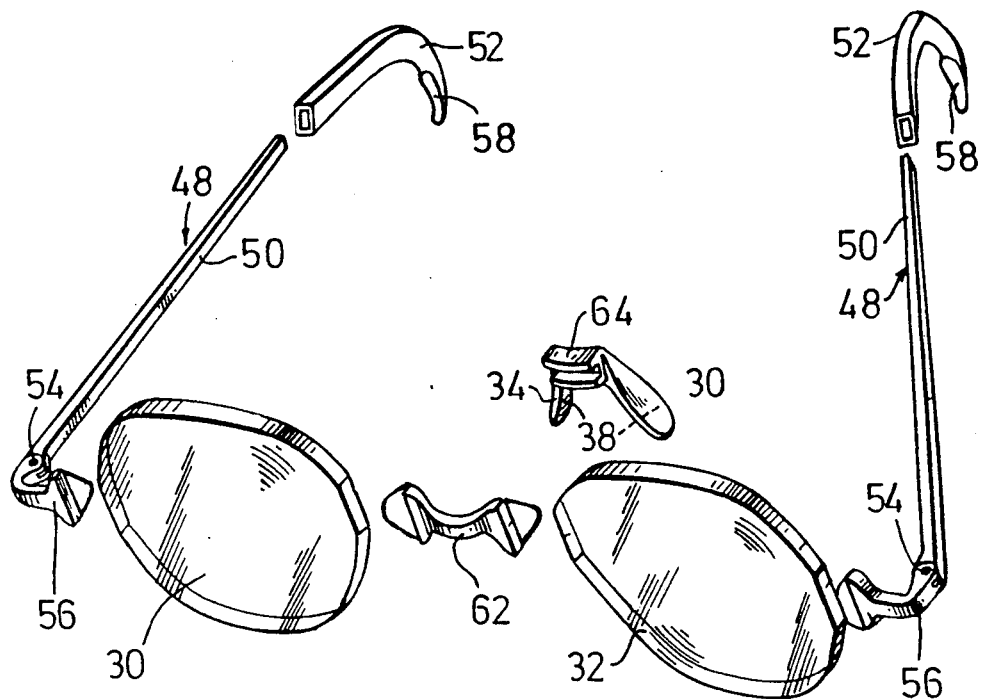
Figure 11:
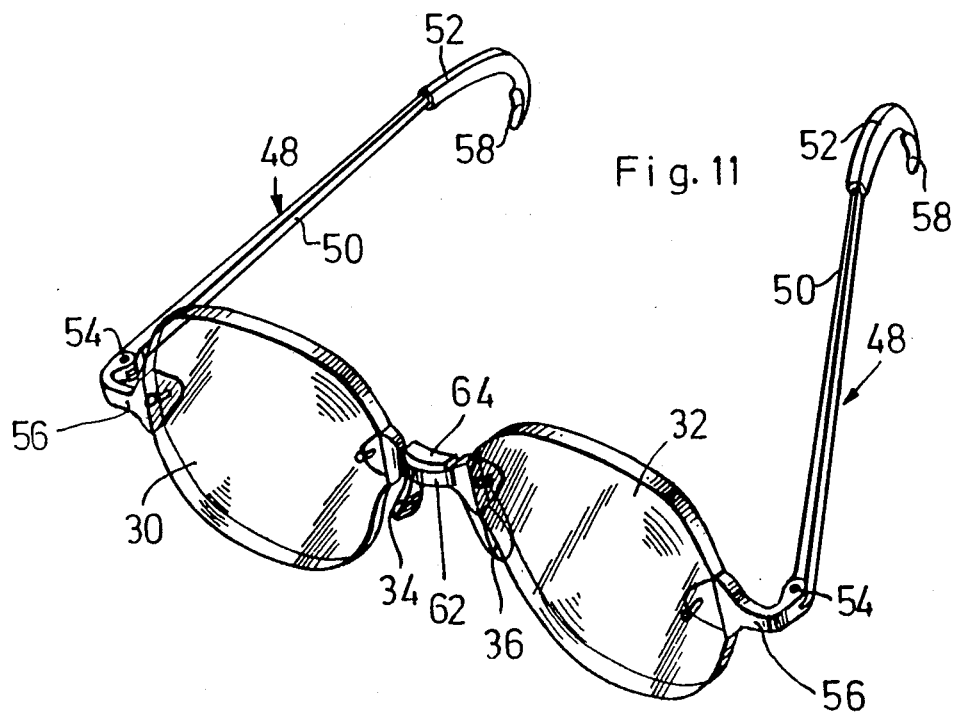

Preferred embodiments of the present invention are explained in closer detail, referring to the drawings. The following are shown:

FIG. 1 a schematic representation in perspective of the eye, nose and ear regions of a spectacle wearer in a spatial coordinate system, together with two lenses;

FIG. 2 a front view in section of the nose of a spectacle wearer;

FIG. 3 a representation in perspective and in section of the nose of a spectacle wearer;

FIG. 4 a side view of a pair of spectacles;

FIG. 5 top view of a pair of spectacles;

FIG 6. a stereometric representation of the face of a spectacle wearer;

FIG. 7 a sectional side view of the ear of a spectacle wearer;

FIG. 8 a representation of the ear according to FIG. 7 from behind;

FIG. 9 a sectional side view of the face of a spectacle wearer in the nose region, together with one spectacle lens place before the eye;

FIG. 10 a view in perspective of spectacles prepared according to a process in accordance with the present invention and not yet in the assembled state; and FIG. 11 a representation in perspective of the spectacles according to FIG. 10 and in the assembled state.

In FIG. 1 a right eye 2 and a left eye 4 can be recognized. Both eyes 2 and 4 each have an eye middle 6 and 8. Above the right eye is located a right eyebrow 10 and above the left eye is located a left eyebrow 12, whereby the two eyebrow regions in FIG. 1 have been indicated solely with one line. Between the two eyes 2 and 4 lies the nose, the bridge 14 of which, left flank 16 and right flank 18, are schematically represented in FIG. 1. The nose bridge 14 at its upper and transforms into the nose bridge base 20. It will be understood that both the nose bridge 14 and the nose bridge base 20 are three-dimensional formations even though in FIG. 1 they are indicated solely by a curve.

Laterally on the skull, (not depicted) of the spectacle wearer is found a left ear 22 and a right ear 24. Each of the two ears has an auricle 26, which in conjunction with the skull forms a groove or furrow 28, at which point the auricle 26 passes over into the skull (see FIGS. 7 and 8). At the upper end of this groove is found each an upper ear base point P1 and P2, which, if looking at the face from the front, represents the deepest point of the transition between the auricle 26 and the skull.

In the process according to the present invention the location of several points are measured. For this purpose a three-dimensional coordinate system is assigned to the spectacle wearer. In the instance depicted in FIG. 1 a Cartesian coordinate system has been chosen with the system coordinate X, Y and Z, for which the x-asis, y-axis and z-axis have been entered in FIG. 1. For the example explained here the origin 0 of the coordinate system is set on the surface of the nose bridge base 20, specifically in the center between the two eye centers 6 and 8. The x-axis runs horizontally in front of and essentially at the same interval from the two eye centers 6 and 8. The z-axis is perpendicular to the x-axis and horizontal, and the x-axis and the z-axis. The x-axis and the y-axis define the x, y plane, which runs essentially parallel to the face and which in the following is referred to as the plane of reference.

In the above-described spatial coordinate system the location of any one point can be defined by its three coordinates x, y and z and described. For two or more points, the locations of which are known in the spatial coordinate system and thus in space, their relative position to one another is thus also completely defined. It will be obvious that this Cartesian coordinate system described here is solely an example of a spatial coordinate system and that other coordinate systems are also suitable for describing the location of points in space and that transformations from one coordinate system to the other are possible.

Only the lenses are shown of spectacles intended to be prepared for the wearer shown in section in FIG. 1, viz. a right lens 30 and a left lens 32. In accordance with the example of the process according to the present invention for preparing spectacles, the shape and size of the lenses and the width of the bridge, this being the smallest interval between the two lenses 30 and 32, are selected by the spectacle wearer, possibly in conjunction with the fitter. Prescription values have been given for the two lenses 30 and 32, i.e. prescribed dioptric effects, since these are spectacles to be prepared that have a correction effect. For each of the two lenses a target position is assigned, specifically as relative to reference points relating to the two eyes 2 and 4, which in the case of the preferred embodiment described means the eye centers 6 and 8. In the target position assigned the lenses will have, for example, a vertex interval of 12 mm, a forward inclination of 6°, a lateral inclination (inclination of the lenses of a type in which the borders farthest from the nose are situated more to the rear than the borders nearest the nose, i.e., have a smaller value of z in the coordinate system) of 3° and a vertical decentration of 2 mm, by virtue of which the optical centers OM of the lenses are located 2 mm vertically below the zero view direction NB (see FIG. 1). By virtue of the assignment of a target position in the manner described above the usual optical and aesthetic requirements with respect to the arrangement of the lenses in front of the eyes have been fulfilled; in addition, the prior specification of this target position makes sure that the lens is arranged with certainty in front of the face of the spectacle wearer and at no place would press into its surface. It will be obvious that the above-mentioned choice of lens characteristics and prior specification of the target position can already have been accomplished while taking into account measurements made on the spectacle wearer and also iteratively. The previously specified target position will have determined whether and how the prescription values of the lenses need be adjusted so that they will be adapted optically to their revised target positions. These lenses are prepared with the correction at the time of their subsequent physical shaping.

Following the above-described choice and specification it will have been determined where the lenses 30 and 32 are located in space relative to the reference points in the form of the two eye centers 6 and 8. This not only applies to points chosen for the two lenses as for example the optical renters OM, but for all points of the two lenses. In the same coordinate system in which the locations of the two eye centers 6 and 8 are known all points of the two lenses 30 and 32 will be known.

The frame, not depicted in FIG. 1, of the spectacles to be prepared has the task of holding the two lenses in the target position in front of the eyes. For this purpose the frame is supported with two nosepads 34 and 36 (see FIG. 11; not shown in FIG. 1) on the two flanks of the nose 16 and 18, whereby the two nose pads 34 and 36 with the nosepad reposing surfaces 38 are in contact with a surface 40 and 42, each of which is formed by an area of the surface of the nose flank 16 and 18. The two contact surfaces 40 and 42 are indicated in FIG. 1 by shading.

Approximately in the center of the two contact surfaces provided for the spectacles the location of a nose point P3 and P4 is measured in space, i.e in the chosen coordinate system. The two nose points are situated in the contact surface 40 and 42 on the surface of the nose flank 16 and 18, whereby the nose point will be measured, while the nose is relaxed and undistorted and without, for example, its having been charged with the nosepads of a pair of spectacles. Since the locations of the two eye centers 6 and 8 serving as reference points are also known in space, the nose point measurement will furnish the exact relative position of the nose points with respect to the eye centers 6 and 8 and also the exact relative positions of the nose points relative to the two lenses 30 and 43 in space since their relative positions with respect to the reference points in the form of the eye centers 6 and 8 have already been determined in space. The result of the nose point measurement will thus be the exact spatial arrangement of the locations of the nose points to the spectacle lenses 30 and 32; this will be made the basis for shaping the spectacles.

Let it be specified, for example, that each of the two nosepad reposing surfaces 38 (if the nose pads 36 and 34 are connected to the lenses 30 and 32) has in its center a surface point which has the same relative position in space with respect to the lenses 30 and 32 as the respectively measured nose points P3 and P4. By virtue of this it will have been determined where the two nosepads 34 and 36 should be located in space relative to the two lenses 30 and 32. The spectacles will be shaped accordingly. In the spectacles shaped accordingly the nosepad reposing surface will be located exactly at that point in space where the contact surfaces 40 and 42 are, provided the lenses 30 and 32 occupy their target positions. By virtue of this, care has been taken simultaneously for a perfect mechanical fit of the spectacles in the nose region and for a perfect optical adaptation. If the nosepad reposing surfaces rest on the assigned contact surfaces 40 and 42 without deformation of the latter, care has been taken simultaneously for the arrangement of the lenses 30 and 32 in their target position.

The determination of the location of each of the nosepad pad reposing surfaces on the strength of measuring one single nose point P3 and P4 will suffice for numerous instances, specifically in those cases especially when the respective nosepad is supported on the remaining frame in pivot-hinge fashion in such a manner that it can swivel within certain limits in a pivot-joint so that it can adapt in space of its own to the directions of the respective contact surfaces 40 and 42. The pivot joint will be located as close as possible to that point on the surface of the nosepad reposing surface which is intended to coincide with the nose point measured when the spectacles are worn.

However, for each nosepad reposing surface two or even more points can be measured. FIGS. 2 and 3 show examples of this. In the example according to FIG. 3 the locations of two nose points P3 and P5 as well as P4 and P6 are measured in each of the two contact surfaces 40 and 42 for two side bridges, and the locations of two assigned points of the assigned nosepad reposing surfaces will accordingly have been determined and formed on the spectacles. This measurement of two nose points per contact surface makes it possible not only to ascertain the location of the relevant nose pad reposing surface in space and to set it for preparing the spectacles, but also a direction in space for the nosepad reposing surface. FIG. 2 shows as an example a contact surface 44 for a so-called saddle bridge, which sits essentially on the nose bridge 14 in the region of the root of the nose bridge 20 or near it. For such a saddle bridge the locations are measured in space, for example, of three nose points P7, P8 and P9 and employed to determine the location, the curvature and the direction in space of an arc-shaped saddle bridge. Further examples of the position of the nose points are shown in FIG. 6. To determine the location and two directions of the nosepad reposing surface of a nosepad reposing against the contact surface 40, the three nose points P8, P12 and P13 will serve, these being situated at the corners of a triangle on the nose flank 16 that defines a surface. In the example illustrated it will be recognized that the nose points can also lie outside the assigned contact surface 16. The corresponding will be true for the nose points P9, P14 and P15 as well as the contact surface 42 on the other nose flank 18. In FIG. 6 the same nose points P8 and P9 are drawn in as in FIG. 2. These nose points P8 and P9, together with the nose points P10 and P11 located both on the nose bridge above and below the nose points P8 and P9, as nose points the locations in space of which are measured for the purpose of ascertaining for a saddle bridge the location and directions of its nosepad reposing surface.

The above-described example shows that several possibilities exist for the nose points, the locations in space of which are measured to determine the bridge-reposing surfaces on the spectacles, these possibilities not having heen completely enumerated in the foregoing.

It has been described in the above how the middle component of a pair of spectacles with its optically and mechanically pertinent elements, i.e. it lenses 30 and 32 and its nosepads 34 and 36 are formed in such a manner that it fits mechanically perfect, i.e., is corrected adapted mechanically and—in the instance of spectacles with a correction effect—is also optically adapted. The support of the middle component on the nose of the spectacle wearer will not fully suffice of itself to retain the spectacles sufficiently firm in place with respect to the usual sources of charging during use. In order to guarantee that the spectacles are adequately kept in place and secured on the face and on the head of the person wearing them the spectacles are provided with temples, not depicted in FIG. 1, which support and anchor the spectacles in the region of the ears 22 and 24.

The mechanical adaptation of the temples to the individual spectacle wearer, i.e. the shaping and alignment of the temples, including their temple end pieces, not shown in FIG. 1, in such a manner that they are in contact with the contact surfaces assigned to them without exercising unduly high pressure can he accomplished for the middle component formed in the manner described above in the conventional subject manner. Preferably, however, this adaptation will also become objectified, as described in the following.

In the preferred embodiment described here of the process in accordance with this invention the locations of the ear base points P1 and P2 are measured in space relative to the eye centers 6 and 8 serving as reference points and thus also relative to the lenses 30 and 32 occupying their target position and to the nose points, e.g. the nose points P3 and P4. This measurement will furnish, for example, for the ear base point P1 its coordinate x1, y1 and z1 (see FIG. 1). Also the locations of the remaining points drawn into consideration are defined by their coordinates x, y and z; for the sake of clarity, however, they have not been drawn in for all points FIG. 1 and are cited solely as a further example for the nose point P3 with x3, y3 and z3.

It will be assigned in space in this manner to the ear base points P1 and P2 so determined where the two temples, not depicted in FIG. 1 should run relative to the ear base points P1 and P2. For example, let it be specified that a so-called temple transition point BU is meant to lie 3 mm vertically above the respective ear base points P1 and P2. That point BU on the left temple 46 and 48 on the right temple (see FIGS. 4 and 5) will be designated the temple transition point on which the essentially straight shaft of the temple or segment of the temple 50 located anterior to the ear transforms into the temple end piece 52 when the spectacles are in position, arranged above the designated ear and behind it. In this manner the location of one of its points in space, viz. of the temple transition points, is determined for each respective temple, using the measurements of the upper ear base point P1 and P2. These spectacles are then formed in such a manner that on the spectacles ready for use the temple end pieces occupy the predetermined location relative to the remaining components of the frame and to the lenses. Care can be taken in so doing that the temples when in position are bent slightly outwardly so that they will repose on the skull in the region of the temple transition point laterally when the desired pressure is applied. The angle of aperature $\Delta$, the angle of inclination $\beta$ and the length of the temple between the hinge 54 and each respective temple transition point (see FIGS. 4 and 5) as result from the shape of the spectacles with the two temple transition points BU, do not depend solely on the location of the respective temple transition point BU, but also depend on the location of the hinge 54 and the relevant flange 56 in space, and this, in turn, is specified by this target position of the assigned lens and the alignment of the flange to the lens and determined by it.

When the spectacles are in position, the temple transition points of the two temples 46 and 48 are intended to occupy that relative position with respect to the two upper ear base points P1 and P2 which is based on the determination of the locations of the temple transition points, depending on the measured locations of the upper ear base points. For this purpose a conventional, subjective mechanical adaptation of the shape of the temple end piece 52 must be conducted at two relevant places on the ear and/or the skull. However, in so doing no changes should be made any more on the middle component and the said temple area have already been adapted mechanically by objective means. To the extent that the two temple end pieces are situated in the specified relative position to the ear base points, the middle component of the spectacles will rest exactly fitted mechanically on the nose and the two lenses will occupy their target position.

The relative alignment taken between the ear base points measured P1 and P2 and the aligned temple transition points BU can also be determined in another manner than that described in the foregoing. For example, it is possible for each respective temple transition point to be shifted forward or backward, i.e. in the direction of the z-axis, with respect to the aligned upper ear base point, or even outwardly in addition, i.e. in the direction of the x-axis.

In the preferred embodiment described here of the process under discussion provision has been made for the temple end pieces 52 no longer to be adapted mechanically in the conventional subjective manner, but to be mechanically in the objective manner, i.e. on the basis of a measurement.

Each of the temple end pieces 52 is in contact with its reposing surface with a second contact surface formed by a surface area on the ear 22 and 24 and/or on the skull, not shown, in the region of the ear. This contact surface is termed a second contact surface in contrast to each of the contact surfaces on the nose, these being the first contact surface in ths context. In order for the aligned temple end piece to be given a shape and an alignment consonant with the second contact surface at the time the spectacles are shaped, the location of at least one ear point P16 (see FIG. 7) is measured in space in or near the second contact surface and thus relative to the eye centers 6 and 8 serving as reference points. From the location of the ear point location of a point BE situated in the reposing surface 58 of the temple end piece 52 and assigned to the ear point P16 is ascertained. The temple end piece 52 is shaped in space with this particular location of the point BE and thus relative to the remaining elements of the frame as well as to the lenses 30 and 32. The alignment between the ear point P16 and the point BE in the reposing surface 58 of the temple end piece 52 can, for example, be accomplished in such a form that the second contact surface and the reposing surface will touch one another without pressure and deformation of the second contact surface when the spectacles are put on. A further possibility is to predetermine that the second contact surface and the reposing surface come into contact at these two points under a certain pressure and that the requisite force for this is generated by elastic deflection of a springy and pliant temple end piece.

When the temple end piece has a certain springy elasticity and can be adapted in its spatial direction to the second contact surface, the measurement of the location of the ear point in or near the second contact surface can be called particularly adequate. In order to make a more exact determination of the second contact surface several more ear points can also be measured in or near this surface and made a basis for the determination of the reposing surface 58.

Although preferably both the locations of the temple transition points BU and the points BE will be predetermined in the reposing surfaces 58, it is also possible to ascertain only one or more points BE to determine the reposing surfaces 58 and not to determine the temple transition point as long as a contact of the temple with the skull and/or ear in the region of the temple transition points is not to take place and care is taken by shifting the temple transition point far enough upward and outward that no collisions occur there with the ear or the skull.

In the preferred embodiment of the process in accordance with the present invention, all nose points measurements and reference point measurements occur by optical means observing the face from the front. For this purpose all intended measurements should be taken at the same time. Since in so doing the second contact surfaces will not be directly visible, but are hidden, the measurement of the ear points will occur in connection with the preferred embodiment described in the manner described as follows.

A feeler 60 is approximately shaped like the reposing surface 58 of the temple end piece for the finished spectacles (see FIG. 7). Such a feeler 60 is placed with its shaped end piece at the second contact surface so that it stands in contact with the second contact surface practically without any pressure and that the upper end of this feeler emerges and becomes visible out from the ear and skull when the face is seen from the front (also see FIG. 6). These two feelers 60 are kept in these positions during the measurement of the nose points. Each of the two feelers 60 is provided with two index markers M1 and M2 as well as M3 and M4, respectively, the locations of which are measured in space relative to the two reference points, so that by virtue of the known alignment of the two markers on the respective feelers and by virtue of the known geometry of the feelers the exact location each feeler in space will be known. Since the feelers, for example, is placed at the ear point P16, the location of the ear point P16 in space will also be measured by virtue of the measurement of the position of the feeler. By virtue of this ear point measurement, the determination will be made of the point BE in each respective reposing surface for each ear in the manner described above.

If the feeler, especially in view of its shape, is placed at several points on the second contact surface, the locations of several ear points in or near each of the two contact surfaces will be measured with the aid of the measurement of the position of this feeler, which will make it possible to determine several points BE for the reposing surface 58 and thus will enable a more exact determination to be made of the latter in space. For reposing surfaces aligned in space at an inclination the lateral angle of inclination of the feeler 60 relative to the vertical $\gamma$ (see FIG. 8) and the backward angle of inclination $\delta$ of the feeler relative to the vertical (see FIG. 7) can be used for determining the directions of the reposing surface 58 in space and the directions used direct.

Although a feeler 60 is described in the above, that is designed at its lower end to match the reposing surface 58, such a shape is not absolutely necessary. A feeler can also be used readily which takes a straight course in the region in which it comes to rest in or near the second contact surface and touches only one point in or near this contact surface.

FIG. 6 with the use of a front view of a face shows as an example, from which points the locations are measured. The presentation of the face in FIG. 6 is the result of a contouring derived from stereoscopic methods, whereby the depth vertical to the drawing plane of this FIG. 6 has been made visible by the use of contour lines perpendicular to the drawing plane of FIG. 6. These contours furnish the interval from the top of the nose, designated "O", in millimeters. This contour illustration furnishes the locations of an infinite number of points, of which, however, only a few are evaluated in the scope of this process for preparing spectacles. The points drawn in and evaluated in FIG. 6 are termed in the same manner as in the remaining figures. To indicate the locations the Cartesian coordinates will serve in the example given. Thus the x-axis runs throuqh the pictures of the two eye centers 6 and 8 in FIG. 6 in such a manner that this x-axis touches the nose base root 20 (see FIG. 1) exactly in the center between the two eye centers 6 and 8. At this point of the axis in the center between the two eye centers 6 and 8 is situated the origin 0 of the coordinate system. The y-axis runs perpendicular to the x-axis and parallel to the drawing plane of FIG. 6 and perpendicular to the xy-plane runs the z-axis, not shown in FIG. 6. The xy-plane forms the plane reference. The two eye centers 6 and 8 serve as the reference points, the half interval of which from one another serves usefully as a unit of length for defining further points to be measured. By the virture of their position on the face and the eyes the inner eye corner points P19 and P20, the outer eye corner points P17 and P18 and the lid points P21 and P22 located on the upper edge of the lower lid, i.e. in the direction of the y-axis, below the center of the relevant eye and which serve as a measuring point of the location of a bifocal segment positioning reference in each respective lens in the event a bifocal lens is envisioned, are all predetermined. The measurements of the locations in the reference plane, i.e. the measurement of the x-coordinates and of the y-coordinates can suffice for the lid points P21 and P22 as well as the eye corner points P17 and P20 if, for example, the lid points are used in the manner described above and the eye corner points, for example, are solely used to determine the disk size or employed to define another unit of length other than the half-interval distance between the eyes.

The above ear base points P1 and P2 are predetermined in their position exclusively by the spectacle wearer; the same is true for the markers M1 and M4. Both the locations of these markers and the locations of the above ear base points P1 and P2 are measured with all three coordinates.

The locations of the nose points measured are not determined solely by the spectacle wearer, but preferably the nose point P10 situated on the nose bridge will be set in the origin 0. The further nose point P11 lies on the nose bridge and in the reference plane on the y-axis as well as one half a length unit below the origin. The measurement of the location of the nose point P11 is thus reduced to the measurement of the z-coordinate. The x and y coordinates of the nose ooints P12 and P13 as well as of the nose point P8 are predetermined in a similar manner as fractions of the length unit. The three latter-named nose points define a surface in which the contact surface 40 provided is located. The nose points P9, P14 and P15 are situated in the reference plane symmetrical to the nose points P8, P12 and P13 and serve as nose points, the locations of which are measured for the purpose of locating the contact surface 42 in space. In the event the spectacles contain a saddle bridge, the noise points P8, P9, P10 and P11 would serve as a means of determining its contact surface.

In addition to the points and markers already mentioned in the above, so-called collision points are also measured in space with respect to their location, the measurements of which are intended to serve to prevent the lenses provided and possibly their eyewires from coming too close to the face of the spectacle wearer. Among these collision points are for each eye two brow points P23 and P24 as well as P25 and P26, in addition to the cheek point 27 and 28. The two brow points P23 and P25 are each situated at the transition from the eye cavity to the forehead and in the reference point vertically above the relevant eye center, so that their x-coordinate is predetermined, while their y and z-coordinates have to be measured. For the respective brow points P24 and P26 situated further inward the x-coordinate in turn is predetermined as a fraction of the length unit while the two other coordinates will have to be measured. For each of the two cheek points 27 and 28 the x and y coordinates are predetermined, as for example with the amount of the half-interval between the eye centers and the z-coordinate is measured. The cheek and brow points ser the purpose of checking by computation or graphically whether the lens provided has in its target position the intervals d1 and d2 from the collision points which are no smaller than a set minimum interval (see FIG. 9).

In a-corresponding manner the nose points P8, P12 and P13 can simultaneously fulfill the function of collision points since they reflect on the inner margin of each respective lens the course of the flank of the nose, so that it can be checked by computation or through graphic means whether the inner margin of the lens or its eyewire maintains a predetermined minimum distance from these flank points. FIG. 16 the two lenses 30 and 32 are also drawn in schematically. It can be seen that, for example, in the choice of the size of the lenses and of the width of the bridge it is possible to include the points measured in that, for example, for aesthetic reasons it is predetermined that the bridge width should be equal to the amount of the x-coordinates of the inner eye corner point P19.

FIGS. 10 and 11 show an example of spectacles prepared according to a preferred embodiment according to this invention, whereby FIG. 10 shows the elements of the spectacles in the as yet unassembled state and FIG. 11 shows the spectacles in the completed and assembled state. Identical reference numerals are used for the elements of these spectacles as in the previous descriptions; the explanations already presented in this respect are not repeated in the following. Since the elements of the preferred embodiment of the spectacles described in the following are initially present in the form of separate component parts which are fitted together after a suitable choice and dimensioning, these can for all practical purposes be termed modules which then go together to result in modular spectacles.

The two spectacle lenses 30 and 32, the shape of which is determined by the model of spectacles selected, the size of which has been selected with consideration for the intervals of the inner eye corner points and the intervals of the outer eye corner points and the dioptric effect because of the prescription values with consideration for a possible correction indicated by virtue of the target position selected, are connected by means of a bridge 62, which is bolted to these lenses 30 and 32 at their two ends since in the example chosen it is a so-called metal-fitting pair of spectacles. The style and location of the connecting sites between the bridge and the two lenses has been chosen together with the model of the spectacles. The bridge width is ascertained from the interval between the inner eye corner points measured as discussed in the above in conjunction with FIG. 6.

During the assembly of the spectacles a bridge component 64 is firmly attached to the bridge 62, which component 64 is formed in one piece with the two nose-pads 34 and 36. The two nosepads 34 and 36 are shaped by plastic deformation with the application of heat in such a manner that their nosepad reposing surfaces 38 on the finished and assembled spectacles have the requisite locations and alignments. The manner in which this happens is explained in detail in the foregoing.

The size of the bridge reposing surfaces 38, i.e. the content of their surfaces, will preferably be ascertained by virtue of the weight of the entire spectacles. Since either by virtue of the choice made or the measurements carried out for all elements or modules of the spectacles it forms, sizes and materials will be known facts, the weight can be determined for all modules or elements and thus the total weight of the spectacles, and specifically to include the weight of the spectacle lenses. By virtue of the spatial arrangement of the bridge reposing surfaces also known from the measurements and the reposing surfaces also known from the measurements and the reposing surfaces of the temple end pieces it can be calculated which share of the weight will be borne by each bridge and each temple end piece. The knowledge of these apportionments of the weight and the directions of the bridge reposing surfaces in space make it possible in turn to calculate for a predetermined surface content of the surfaces mentioned the pressures prevailing there on account of the weight of the spectacles and to compare them with admissible pressures or to dimension the surface contents in such a manner that only certain admissible pressures prevail there.

The style and type of mounting for the flanges 56 and the lenses 30 and 32 will have been chosen in the choice of spectacle model. The two flanges 56, however, are shaped plastically with the application of heat in such a manner that the angle of opening $\alpha$ and the angle of inclination $\beta$ have the values necessary for the temple transition points BU to lie at a predetermined location relative to the remaining elements of the spectacles (see FIGS. 4 and 5). The formation of the length occurs from the same point of view for the two temples up to the temple transition points. In the preferred embodiment illustrated of these spectacles provision is made for the shafts 50 of the temples 46 to be so trimmed that the respective temple transition point will be situated exactly at the free end of the shaft 50. Each of the relevant temple end pieces 52 is shoved at this free end up to a recess formed in the temple end piece 52. The temple end piece for its part has been deformed plastically prior to this with the application of heat so that it will guarantee the alignment of the temple transition point and the points BE (see FIG. 4) as ascertained spatially by virtue of the ear base point measurement and the ear point measurement in its condition of being connected to the shaft 50. The size of the reposing surface 58, i.e. its surface content, is determined with allowance made for the weight of the spectacles in the manner described above or is at least checked for this.

It may be seen that the completed spectacles will be exactly fitted individually to the spectacle wearer, and specifically both mechanically as well as optically, whereby the entire mechanical adaptation is not accomplished according to the traditional pattern subjectively but objectively. The information required for the mechanical adaptation is obtained in one single measurement procedure by the stereoscopic method. This single measuring process costs the wearer very little time and causes him no discomfort, so that he can be supplied with very well-fitting spectacles individually adapted to him in a comfortable manner and with very little expenditure of time.

The process in accordance with this invention is especially suited to the preparation of spectacles with correction effect that is adjusted both optically and mechanically, whereby the mechanical adjustment is objectified at the least to a very considerable degree and the mechanical adjustment will depend to a lesser extent or not at all on the subjective evaluation of the fit of the spectacle on the part of the fitter of the spectacle wearer. For each nosepad of the spectacles the location of at least one nose point is measured in or near the contact surface onto which the nosepad reposing surface will touch the nose, this in space relative to two reference points, e.g. the eye centers. From these nose point measurements the location of the nosepad reposing surface is measured which this will occupy in space on the completed spectacles, which, for example, occurs under the assumption of pressureless contact between the contact surface and the reposing surface. Corresponding to this determination the nosepads of the spectacles are physically formed, specifically in their correct relative position with respect to the lenses since a target position is predetermined for the lenses in space with respect to two reference points to it.

We claim:

1. Process for the construction of spectacles from two lenses and a frame which comprises a bridge including at least one pad having a reposing surface, two flanges and two temples, said process comprising the steps of: establishing a spatial coordinate system; using an optical means which observes the wearer's face from the front to determine the coordinates in said system of the centers of the wearer's eyes as reference points; specifying an initial target position in said coordinate system which said lenses are intended to occupy relative to the face of the wearer; using said optical means to determine the coordinates in said system of at least one point on the surface of the wearer's nose; subsequently determining a final target position which said lenses are intended to occupy in said spatial coordinate system and relative to sid reference points and said point on thwearer's nose; correcting, if necessary, the dioptric effects of the lenses to be in accord with the final target position; using said optical means to determine, relative to said final target position, the coordinates of a point on said reposing surface intended for contact with the wearer's nose; and joining the spectacle lenses, said bridge and the remaining components of the frame in such a manner that the lenses occupy said final target position when the point on said reposing surface of said pad contacts the wearer's nose.

2. Process according to claim 1, further comprising the steps of determining the coordinates of two points on opposite sides of the wearer's nose in or near the contact surface of the nosepad, and determining from the coordinates of said two nose points, the location of the nosepad reposing surface and the orientation of the latter in space and constructing the spectacles with this orientation.

3. Process according to claim 1, further comprising the step of determining the coordinates in space of three nose points forming a triangle in or near the intended nose contact surface and determining from the coordinates of said three nose points on each nose flank, the location of the nosepad reposing surface and the orientation of the latter in space, and constructing the spectacles with these orientations.

4. Process according to claim 2 wherein a third nose point is situated on the ridge of the nose and the two other nose points are situated on either side of the nose ridge point, and, from this nose point measurement, also determining the curvature for an arc-shaped bridge and its alignment, and shaping the spectacles with this curvature and alignment.

5. Process according to claim 4, further comprising the steps of determining the coordinates of a fourth nose point situated on the nose ridge, and determining from the coordinates of the two nose ridge points the inclination of the nose bridge, and constructing the spectacles with an inclination of the middle region of the bridge reposing surface of the arc-shaped bridge that corresponds to that particular inclination.

6. Process according to claim 1, wherein two of the three coordinates of said at least one nose point are predetermined and the relevant third coordinate is sought.

7. Process according to claim 6, wherein the nose point measurement is accomplished in a coordinate system in which two system coordinates are defined in one reference plane which runs essentially parallel to the face of the spectacle wearer, and that the third system coordinate runs normal to this reference plane.

8. Process according to claim 7, wherein the interval from the reference plane is the sought third coordinate.

9. Process according to claim 6, wherein the two predetermined coordinates are each predetermined as a fraction of the distance between the two eye reference points.

10. Process according to claim 6, wherein the coordinate of all nose points and reference points are measured simultaneously.

11. Process according to claim 6, wherein the coordinates of all nose points and reference points are measured without touching the face and the eyes of the spectacle wearer.

12. Process according to claim 1, further comprising the steps of determining, for each ear, the location of the uppper ear root point at the transition between the skull and auricle of the spectacle wearer, relative to a minimum of two reference points, and determining from this ear root point measurement for each respective ear the location of a temple transition point at which a temple segment located anterior to the ear transforms into a temple end piece and which is situated above the upper ear base point, and constructing the spectacles with said locations of said temple transition points.

13. Process according to claim 12, wherein the ear base point measurement is accomplished simultaneously with the nose point measurement.

14. Process according to claim 12, wherein the ear base point measurement is accomplished without touching the ears of the spectacle wearer.

15. Process according to claim 12, wherein on each side of the head of the spectacle wearer a second contact surface is determined on the skull and/or the ear for contact with a temple end piece, and further comprising the steps of determining the location in space of at least one ear point in or near each of the second contact surfaces of the skull and/or of the ear relative to a minimum of two reference points, determining from this ear point measurement the location of the reposing surface of each temple end piece, and constructing the spectacles by means of a corresponding choice or alignment of each temple end piece with this particular location on the temple end piece reposing surface.

16. Process according to claim 18, wherein the nose point measurement is accomplished by said optical means by observing the face essentially from the front, and that for the ear point measurement a feeler is placed on the second contact surface which will protrude from the hidden region of the ear and skull, measuring the position of the feeler in space, and measuring from the feeler position the location of the minimum of one ear point.

17. Process according to claim 16, wherein the measurement of the position of the feeler in space and the nose point measurement are accomplished simultaneously.

18. Process according to claim 1, further comprising the steps of determining the coordinates for each eye, of at least one brow point in the eyebrow region relative to a minimum of two reference points and constructing the spectacles with a target position of each lens in which that lens or frame surface which is situated closest to one of the brow points is provided with a predetermined minimum distance from the relevant brow point.

19. Process according to claim 8, wherein one of the measured brow points is situated in a reference plane essentially parallel to the face vertically above the center of the respective eye.

20. Process according to claim 18, wherein one of the measured brow points is situated in the eyebrow region near the nose.

21. Process according to claim 1, further comprising the steps of determining the coordinates for each eye, of at least one cheek point in the cheek region below the respective eye relative to a minimum of two reference points and constructing the spectacles with a target position of each lens in which that lens or frame surface which is situated closest to one of the cheek points is provided with a predetermined minimum distance from the relevant cheek point.

22. Process according to claim 21, wherein one of the measured cheek points is situated in a reference plane essentially parallel to the face vertically below the eye center of the respective eye.

23. Process according to claim 1, wherein as a measure for the spatial location of each nose flank, on each nose flank the locations of at least three flank points forming a triangle are measured in space relative to a minimum of two reference points and that the spectacles are constructed with a target position of each lens in which that surface point of the lens or of the eyewire of the lens which is nearest the surface defined by the flank points measured will have a minimum distance from this surface.

24. Process according to claim 18, wherein the measurement of the locations of the brow points is accomplished simultaneously with the nose point measurement.

25. Process according to claim 21, wherein the measurement of the locations of the cheek points is accomplished simultaneously with the nose point measurement.

26. Process according to claim 23 wherein the measurement of the locations of the flank points is accomplished simultaneously with the nose point measurement.

27. Process according to claim 18, wherein the measurement of the locations of the brow points is accomplished without touching the brow of the spectacle wearer.

28. Process according to claim 21, wherein the measurement of the locations of the cheek points is accomplished without touching the cheeks of the spectacle wearer.

29. Process according to claim 23, wherein the measurement of the locations of the flank points is accomplished without touching the nose of the spectacle wearer.

30. Process according to claim 1, wherein for each eye, the location is measured below it of a point that will serve to determine the location of a bifocal separation line.

31. Process according to claim 30, wherein the measuring point is situated on the upper edge of the lower lid of the eye.

* * * * *